United States Patent
Yang et al.

(10) Patent No.: US 10,516,327 B2
(45) Date of Patent: Dec. 24, 2019

(54) SYSTEM AND METHOD FOR CONTROLLING SWITCHING DEVICE IN POWER CONVERTER

(71) Applicant: SEMICONDUCTOR COMPONENTS INDUSTRIES, LLC, Phoenix, AZ (US)

(72) Inventors: Seung-Uk Yang, Anyang (KR); Wonseok Lim, Bucheon (KR); Hyun-Chul Eum, Bucheon (KR)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 15/653,930

(22) Filed: Jul. 19, 2017

(65) Prior Publication Data
US 2019/0028016 A1    Jan. 24, 2019

(51) Int. Cl.
*H02M 1/08* (2006.01)
*H02M 7/217* (2006.01)

(52) U.S. Cl.
CPC .............. *H02M 1/08* (2013.01); *H02M 7/217* (2013.01); *H02M 7/2176* (2013.01)

(58) Field of Classification Search
CPC ............... H02M 1/08; H02M 1/32; H02M 3/3353–33546; H02M 3/3374; H02M 7/217; H02M 7/2176; H02M 7/219; H02M 7/25
See application file for complete search history.

(56) References Cited

U.S. PATENT DOCUMENTS

| | | | | |
|---|---|---|---|---|
| 4,709,322 A | * | 11/1987 | Mirow | H02M 7/217 323/285 |
| 5,036,269 A | * | 7/1991 | Murari | G05F 1/571 323/266 |
| 5,132,893 A | * | 7/1992 | Klein | G05F 1/563 323/901 |
| 5,307,257 A | * | 4/1994 | Fukushima | H02M 7/2176 323/300 |
| 5,818,708 A | * | 10/1998 | Wong | H02M 7/2176 363/89 |

(Continued)

OTHER PUBLICATIONS

Fairchild Semiconductor, "FSAR001 AC-DC Linear Regulator", Apr. 2012.

*Primary Examiner* — Thomas J. Hiltunen
(74) *Attorney, Agent, or Firm* — AMPACC Law Group, PLLC

(57) ABSTRACT

A method for controlling a power converter includes receiving an input signal through an input node and generating an intermediate signal using a capacitor, generating a control signal in response to the input signal and the intermediate signal, coupling or decoupling the input node and the capacitor in response to the control signal, and generating an output signal in response to the intermediate signal. A circuit for controlling a power converter includes an input node receiving an input signal, a first capacitor providing an intermediate signal, a detection circuit generating a control signal in response to the input signal and the intermediate signal, a switching device coupling the input node and the first capacitor in response to the control signal, and a regulator generating an output signal in response to the intermediate signal.

19 Claims, 3 Drawing Sheets

(56) References Cited

U.S. PATENT DOCUMENTS

| | | | |
|---|---|---|---|
| 6,300,748 B1 * | 10/2001 | Miller | G05F 1/565 323/266 |
| 6,324,084 B1 * | 11/2001 | Fujisawa | G04G 19/02 363/127 |
| 6,815,940 B2 * | 11/2004 | Nakashimo | H03K 17/063 323/288 |
| 7,183,756 B1 * | 2/2007 | Dikken | G01R 19/0092 323/280 |
| 7,554,307 B2 * | 6/2009 | Moraveji | G05F 1/575 323/280 |
| 7,573,251 B2 | 8/2009 | Yang et al. | |
| 7,592,793 B2 | 9/2009 | Yang | |
| 7,920,013 B2 * | 4/2011 | Sachdev | H03K 17/165 327/379 |
| 8,283,907 B1 * | 10/2012 | Jayaraj | H02M 3/156 323/282 |
| 8,917,076 B2 * | 12/2014 | Hsing | G05F 1/56 323/271 |
| 9,093,903 B2 * | 7/2015 | Swaminathan | H02M 7/2176 |
| 9,225,260 B2 * | 12/2015 | Neyman | H02M 7/2176 |
| 9,472,943 B2 * | 10/2016 | Urienza | H02H 7/1252 |
| 9,608,510 B2 * | 3/2017 | Kuang | H02M 1/32 |
| 9,876,497 B2 * | 1/2018 | Hwang | H02M 7/219 |
| 2003/0034763 A1 * | 2/2003 | Bruno | H02M 7/2176 323/282 |
| 2004/0004469 A1 * | 1/2004 | Pihet | G05F 1/575 323/282 |
| 2004/0227495 A1 * | 11/2004 | Egan | G05F 1/618 323/272 |
| 2006/0083038 A1 * | 4/2006 | Lynch | H02M 7/2176 363/127 |
| 2006/0187692 A1 * | 8/2006 | Elferich | H02M 3/1588 363/125 |
| 2009/0231895 A1 * | 9/2009 | Hu | H02M 3/33592 363/127 |
| 2010/0027298 A1 * | 2/2010 | Cohen | H02M 3/33592 363/21.14 |
| 2013/0176009 A1 * | 7/2013 | Yang | G05F 1/56 |
| 2014/0133202 A1 * | 5/2014 | Tamaoka | H02M 1/4225 363/74 |
| 2015/0256098 A1 * | 9/2015 | Buthker | H02M 3/156 363/126 |
| 2015/0288293 A1 * | 10/2015 | Siessegger | H05B 33/0803 315/246 |

* cited by examiner

SYSTEM AND METHOD FOR CONTROLLING SWITCHING DEVICE IN POWER CONVERTER

FIELD OF THE DISCLOSURE

The present disclosure relates to integrated circuit devices, and more particularly to a power converter.

BACKGROUND

A power converter may include a capacitor providing a supply voltage and a regulator, which converts the supply voltage to an output voltage and provides the output voltage to a load. When the power converter operates under a steady state condition, dissipated power in the regulator and power supplied to the load decreases energy stored in the capacitor. In order to compensate for the decrease in energy stored in the capacitor, the power converter may further include a switch connecting the capacitor to an input voltage.

When the switch is turned on to charge the capacitor using the input voltage, a difference between a level of the input voltage and a level of the supply voltage of the capacitor may cause a current spike flowing into the capacitor and the regulator. Thus, the power regulator may include a filter resistor, a snubber circuit or both to reduce a magnitude of the current spike. However, the filter resistor and the snubber circuit are generally large and consume a relatively large amount of power.

BRIEF DESCRIPTION OF THE DRAWINGS

In the accompanying figures like reference numerals refer to identical or functionally similar elements throughout the separate views, together with the detailed description below, and are incorporated in and form part of the specification to further illustrate embodiments of concepts that include the claimed invention and explain various principles and advantages of those embodiments.

DETAILED DESCRIPTION

Figure 1:
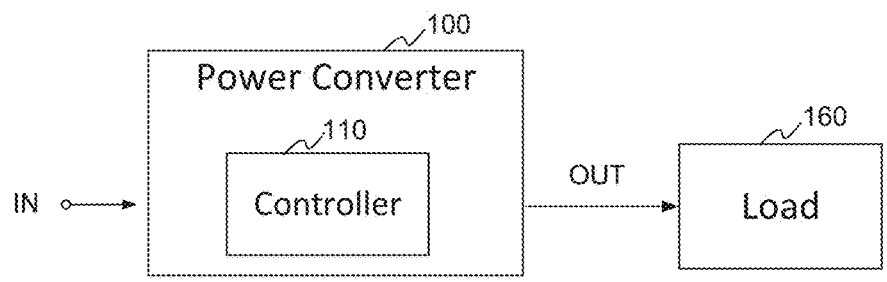
FIG. 1 illustrates a block diagram of a power converter according to an embodiment.

Embodiments relate to a circuit and a method for controlling a power converter.

In the following detailed description, certain illustrative embodiments have been illustrated and described. As those skilled in the art would realize, these embodiments may be modified in various different ways without departing from the scope of the present disclosure. Accordingly, the drawings and description are to be regarded as illustrative in nature and not restrictive. Like reference numerals designate like elements in the specification.

In an embodiment, a method for controlling a power converter includes receiving an input signal through an input node and generating an intermediate signal using a capacitor, generating a control signal in response to the input signal and the intermediate signal, coupling or decoupling the input node and the capacitor in response to the control signal, and generating an output signal in response to the intermediate signal.

In an embodiment, the method further includes turning on a switching device to couple the input node and the capacitor when a first comparison result is obtained, and turning off the switching device to decouple the input node and the capacitor when a second comparison result is obtained. The switching device is turned on when the input signal has a value substantially equal to a value of the intermediate signal.

FIG. 1 illustrates a power converter 100 according to an embodiment. The power converter 100 receives an input signal IN and provides an output signal OUT to a load 160.

The power converter 100 in FIG. 1 includes a controller 110. The controller 110 in FIG. 1 may be integrated in a semiconductor chip, and the semiconductor chip may be packaged by itself or together with one or more other semiconductor chips.

The load 160 in FIG. 1 may include one or more integrated chips (ICs). In an embodiment, the output signal OUT is used to supply power to a Central Processing Unit (CPU), a Graphics Processing Unit (GPU), an integrated memory circuit, a battery charger, a light emitting diode (LED), or other types of electrical load.

Figure 2:
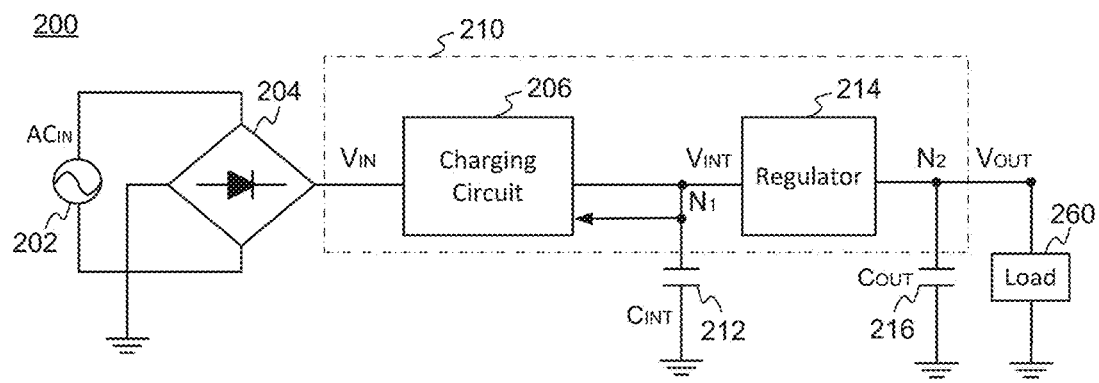
FIG. 2 illustrates a power converter suitable for use as the power converter of FIG. 1 according to an embodiment.

FIG. 2 illustrates a power converter 200 suitable for use as the power converter 100 of FIG. 1. The power converter 200 includes a power supply 202, a rectifier 204, a controller 210, a first capacitor (or an input capacitor) 212, a second capacitor (or an output capacitor) 216, and a load 260.

The power supply 202 in FIG. 2 provides an AC input signal $AC_{IN}$ to the rectifier 204, which inverts the negative halves of the received AC signal to generate a rectified AC signal (e.g., an input voltage) $V_{IN}$. Although the embodiment shown in FIG. 2 includes the full-wave rectifier 204, embodiments of the present disclosure are not limited thereto. In an embodiment, the rectifier 204 is a half-wave rectifier.

The controller 210 in FIG. 2 includes a charging circuit 206 and a regulator 214. The controller 210 receives the input voltage $V_{IN}$, charges the first capacitor 212, and provides an output voltage $V_{OUT}$ to the load 260. When the power converter 200 operates under a steady state condition, energy stored in the first capacitor 212 decreases due to power dissipated in the power converter 200 and power supplied to the load 260. In order to compensate for the decreased energy in the first capacitor 212, the charging circuit 206 in FIG. 2 charges the first capacitor 212 during a given time interval in response to the input voltage $V_{IN}$ and an intermediate signal (e.g., an intermediate voltage) $V_{INT}$. In an embodiment, the charging circuit 206 charges the first capacitor 212 during a predetermined time interval from a first time when the input voltage $V_{IN}$ exceeds the intermediate voltage $V_{INT}$ to a second time when the input voltage $V_{IN}$ reaches a reference voltage.

The regulator 214 in FIG. 2 generates the output voltage $V_{OUT}$ using the intermediate voltage $V_{INT}$ and provides the output voltage $V_{OUT}$ to the load 260. In an embodiment, the regulator 214 is a low-dropout (LDO) regulator including a switching device and an amplifier.

The first capacitor 212 in FIG. 2 has a first end connected to a first node $N_1$ between the charging circuit 206 and the regulator 214 and a second end connected to a ground. A voltage at the first end of the first capacitor 212 corresponds to the intermediate voltage $V_{INT}$.

The second capacitor 216 in FIG. 2 has a first end connected to a second node $N_2$ between the regulator 214 and the load 260 and a second end connected to the ground. A voltage at the first end of the second capacitor 212 corresponds to the output voltage $V_{OUT}$.

Figure 3:
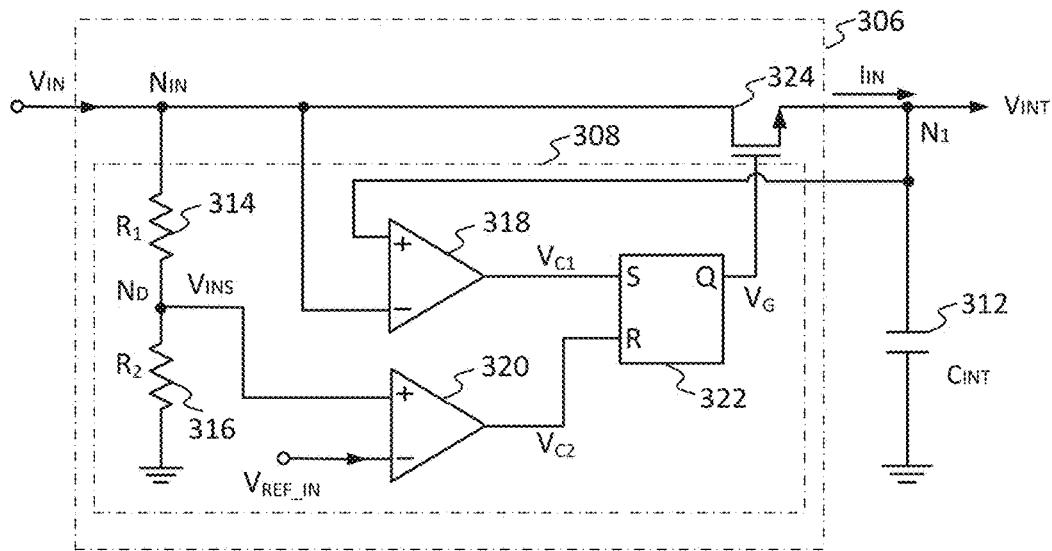
FIG. 3 illustrates a charging circuit suitable for use as a charging circuit of FIG. 2 according to an embodiment.

FIG. 3 illustrates a charging circuit 306 suitable for use as the charging circuit 206 of FIG. 2 according to an embodiment. The charging circuit 306 in FIG. 3 includes a detection circuit 308 and a switching device 324. An input capacitor 312 suitable for use as the capacitor 212 of FIG. 2 has a first end connected to the detection circuit 308 and the switching device 324 and a second end connected to a ground.

The detection circuit 308 in FIG. 3 includes first and second resistors 314 and 316, first and second comparators 318 and 320, and a flip-flop 322. The detection circuit 308 receives an input signal (e.g., an input voltage) $V_{IN}$ and an intermediate signal (e.g., an intermediate voltage) $V_{INT}$, and generates a gate control signal (e.g., a gate voltage) $V_G$ in response to the received input voltage $V_{IN}$ and the intermediate voltage $V_{INT}$.

The first and second resistors 314 and 316 in FIG. 3 function as a voltage divider and generates a scaled version of the input signal (e.g., a scaled input voltage) $V_{INS}$ at a node $N_D$ between the first and second resistors 314 and 316. The scaled input voltage $V_{INS}$ can be represented by Equation 1:

$$V_{INS} = V_{IN} \times \frac{R_2}{R_1 + R_2}. \quad \text{Equation 1}$$

In Equation 1, $R_1$ denotes a resistance value of the first resistor 314 and $R_2$ denotes a resistance value of the second resistor 316.

The first comparator 318 in FIG. 3 compares the input voltage $V_{IN}$ and the intermediate voltage $V_{INT}$ and generates a first comparison signal $V_{C1}$ according to the comparison result. In an embodiment, the first comparator 318 generates the first comparison signal $V_{C1}$ having a first logic value (e.g., a logic high value) when the intermediate voltage $V_{INT}$ becomes equal to or greater than the input voltage $V_{IN}$, and generates the first comparison signal $V_{C1}$ having a second logic value (e.g., a logic low value) when the intermediate voltage $V_{INT}$ becomes less than the input voltage $V_{IN}$.

The second comparator 320 in FIG. 3 compares the scaled input voltage $V_{INS}$ to a reference voltage $V_{REF\_IN}$, and generates a second comparison signal $V_{C2}$ according to the comparison result. In an embodiment, the second comparator 320 generates the second comparison signal $V_{C2}$ having a first logic value (e.g., a logic high value) when the scaled input voltage $V_{INS}$ becomes equal to or greater than the reference voltage $V_{REF\_IN}$, and generates the second comparison signal $V_{C2}$ having a second logic value (e.g., a logic low value) when the scaled input voltage $V_{INS}$ becomes less than the reference voltage $V_{REF\_IN}$.

The flip-flop 322 in FIG. 3 receives the first and second comparison signals $V_{C1}$ and $V_{C2}$ from the first and second comparators 318 and 320, respectively, and generates a gate voltage $V_G$ in response to the received comparison signals. In an embodiment, the flip-flop 322 is a set/reset (RS) flip-flop, which receives the first comparison signal $V_{C1}$ from the first comparator 318 as a set signal and the second comparison signal $V_{C2}$ from the second comparator 320 as a reset signal.

The switching device 324 in FIG. 3 is turned on to couple the input node $N_{IN}$ to the first end of the capacitor 312 or turned off to decouple the input node $N_{IN}$ and the first end of the capacitor 312, in response to the gate voltage $V_G$. In an embodiment, the switching device 324 is a n-channel metal-oxide semiconductor (NMOS) transistor, which is turned on in response to the gate voltage $V_G$ indicating a first logic value (e.g., a logic high value) and turned off in response to the gate voltage $V_G$ indicating a second logic value (e.g., a logic low value).

Figure 4:
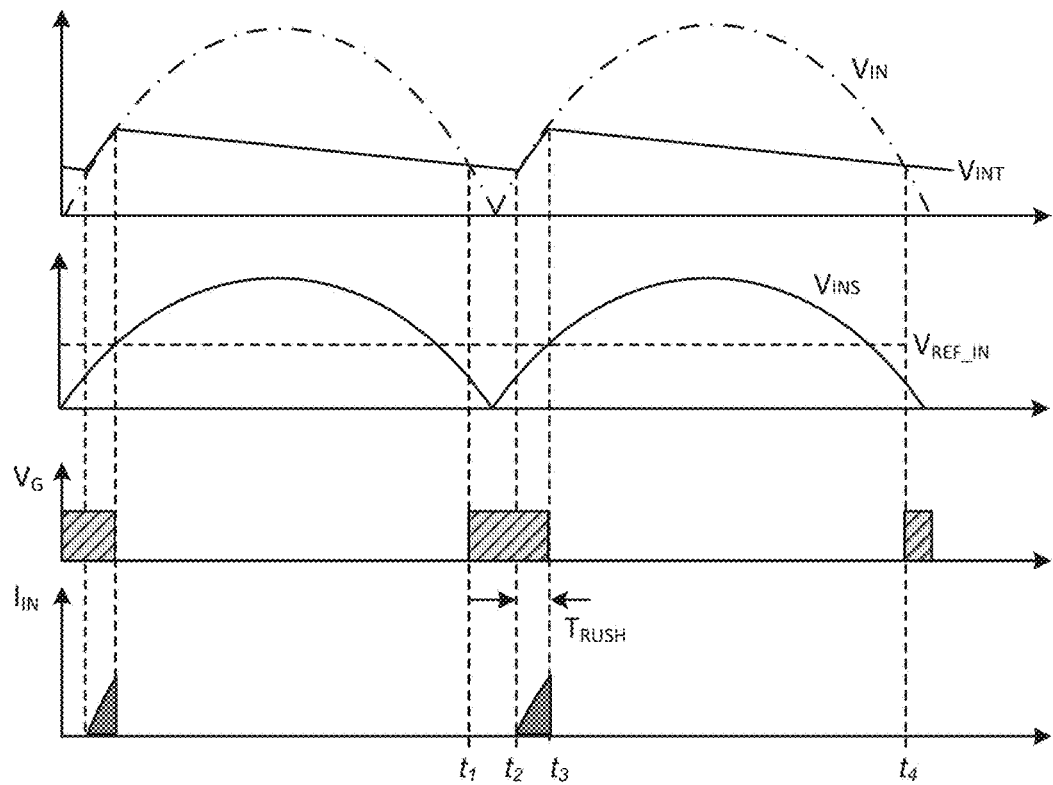
FIG. 4 illustrates an operation of a charging circuit (e.g., the charging circuit in FIG. 3) according to an embodiment.

FIG. 4 illustrates an operation of a charging circuit (e.g., the charging circuit 306 in FIG. 3) according to an embodiment. The figure shows example waveforms of an input signal $V_{IN}$ (e.g., the input voltage $V_{IN}$ in FIG. 3), a scaled version of the input signal $V_{INS}$ (e.g., the scaled input voltage $V_{INS}$ in FIG. 3), an intermediate signal $V_{INT}$ (e.g., the intermediate voltage $V_{INT}$ in FIG. 3), a gate control signal $V_G$ (e.g., the gate voltage $V_G$ in FIG. 3), and an internal current $I_{IN}$ (e.g., the internal current $I_{IN}$ in FIG. 3).

At a first time $t_1$ in FIG. 4, the intermediate voltage $V_{INT}$ becomes substantially equal to the input voltage $V_{IN}$. For example, the intermediate voltage $V_{INT}$ becomes substantially equal to the input voltage $V_{IN}$ when a difference between the intermediate voltage $V_{INT}$ and the input voltage $V_{IN}$ becomes equal to or less than a predetermined percentage (e.g., 0.1%, 0.5%, 1%, 3%, 5%, or 10%) of a level of the input voltage $V_{IN}$ at the first time $t_1$. As a result, the first comparator 318 in FIG. 3 generates the first comparison signal having a first logic value (e.g., a high logic value) as a set signal to the flip-flop 322 in FIG. 3. The flip-flop 322 generates the gate voltage $V_G$ indicating a logic high value, and thus the switching device 324 in FIG. 3 is turned on in response to the gate voltage $V_G$ to couple the input node $N_{IN}$ to the first end of the input capacitor 312. When the switching device 324 is turned on, the input voltage $V_{IN}$ is substantially equal to the intermediate voltage $V_{INT}$, and thus the internal current $I_{IN}$ is substantially prevented from flowing into the input capacitor 312 and a regulator (e.g., the regulator 214 in FIG. 2).

During a first time interval between the first time $t_1$ and a second time $t_2$ in FIG. 4, the intermediate voltage $V_{INT}$ remains higher than the input voltage $V_{IN}$. As a result, the intermediate voltage $V_{INT}$ at the first end of the input capacitor 312 in FIG. 3 continues to decrease until the input voltage $V_{IN}$ reaches the intermediate voltage $V_{INT}$ at the second time $t_2$.

During a second time interval (or a charging period) $T_{RUSH}$ between the second time $t_2$ and a third time $t_3$ in FIG. 4, the input voltage $V_{IN}$ increases to cause a portion of the internal current $I_{IN}$ to flow into the input capacitor 312 in FIG. 3. As a result, the input capacitor 312 is charged to make the intermediate voltage $V_{INT}$ at the first end of the input capacitor 312 substantially follow the input voltage $V_{IN}$. The charging period $T_{RUSH}$ is determined based on the input voltage $V_{IN}$ and the intermediate voltage $V_{INT}$. In an embodiment, the charging period $T_{RUSH}$ is determined by one or more of a frequency of the input voltage $V_{IN}$, an amplitude of the input voltage $V_{IN}$, a level of the intermediate voltage $V_{INT}$, the capacitance value of the input capacitor 312, the resistance value $R_1$ of the first resistor 314, the resistance value $R_2$ of the second resistor 316, and a level of the reference voltage $V_{REF\_IN}$.

At the third time $t_3$ in FIG. 4, the scaled input voltage $V_{INS}$ reaches the reference voltage $V_{REF\_IN}$. As a result, the second comparator 320 in FIG. 3 generates the second comparison signal having a first logic value (e.g., a logic high value) as a reset signal to the flip-flop 322 in FIG. 3.

The flip-flop 322 generates the gate voltage $V_G$ indicating a second logic value (e.g., a logic low value), and thus the switching device 324 is turned off in response to the gate voltage $V_G$ to decouple the input node $N_{IN}$ and the first end of the input capacitor 312 in FIG. 3.

During a third time interval between the third time $t_3$ and a fourth time $t_4$ in FIG. 4, energy stored in the capacitor 312 in FIG. 3 decreases due to power loss in the charging circuit 306 in FIG. 3 and a regulator (e.g., the regulator 214 in FIG. 2). As a result, the intermediate voltage $V_{INT}$ also decreases, and the intermediate voltage $V_{INT}$ becomes substantially equal to the input voltage $V_{IN}$ again at the fourth time $t_4$.

As described above, in a power converter according to an embodiment of the present disclosure including a charging circuit (e.g., the charging circuit 306 in FIG. 3) and a regulator (e.g., the regulator 214 in FIG. 2), an internal current (e.g., the internal current $I_N$ in FIG. 3) is substantially prevented from flowing into an input capacitor (e.g., the input capacitor 312 in FIG. 3) and the regulator at a time (e.g., the first time $t_1$ in FIG. 4) when a switching device (e.g., the switching device 324 in FIG. 3) is turned on. As a result, a current spike occurring at a time when a switching device is turned on in a conventional power converter does not occur in the power converter according to such an embodiment. Accordingly, a power convertor according to an embodiment of the present disclosure might not need a filter resistor, a snubber circuit, or the like to reduce the current spike, enabling it to be smaller in size and consume less power compared to the conventional power converter.

In addition, a charging period (e.g., the charging period $T_{RUSH}$ in FIG. 4) for charging the input capacitor of the power converter according to an embodiment (e.g., "the present power converter") is longer than that for charging a capacitor in the conventional power converter. As a result, even when an amount of the charged energy in the input capacitor of the present power converter is greater than that in the capacitor of the conventional power converter, a peak magnitude of the internal current at the end (e.g., the third time $t_3$ in FIG. 4) of the charging period in the present power converter remains comparable to a peak magnitude of an internal current at the end of a time period for charging the capacitor in the conventional power converter.

Figure 5:
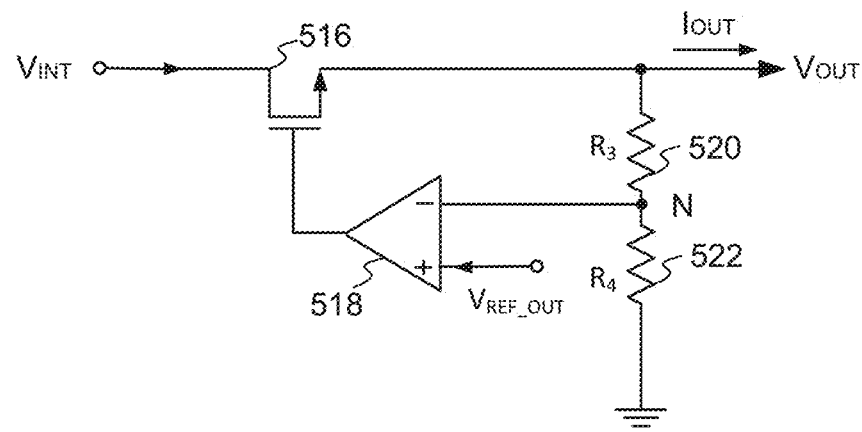
FIG. 5 illustrates a regulator suitable for use as a regulator of FIG. 2 according to an embodiment.

FIG. 5 illustrates a regulator 514 suitable for use as the regulator 214 of FIG. 2 according to an embodiment. In the embodiment shown in FIG. 5, the regulator 514 is a low-dropout (LDO) regulator that includes a transistor 516, an amplifier 518, and first and second resistors 520 and 522.

The transistor 516 in FIG. 5 receives an amplified signal from the amplifier 518 and changes its resistance value in response to a value of the amplified signal. In an embodiment, the transistor 516 is an NMOS transistor and the resistance value of the NMOS transistor 516 decreases when a gate-to-source voltage on the NMOS transistor 516 increases.

The amplifier 518 in FIG. 5 receives a reference voltage $V_{REF\_OUT}$ and a voltage at a node N between the first and second resistors 520 and 522. In an embodiment, the amplifier 518 has and a positive input terminal connected to the reference voltage $V_{REF\_OUT}$ and a negative input terminal connected to the node N between the first and second resistors 520 and 522.

The LDO regulator 514 in FIG. 5 maintains the output voltage $V_{out}$ at a substantially constant level, which can be represented by Equation 2 below:

$$V_{OUT} = V_{REF\_OUT} \times \frac{R_3 + R_4}{R_4}. \qquad \text{Equation 2}$$

In Equation 2, $R_3$ denotes a resistance value of the first resistor 520 and $R_4$ denotes a resistance value of the second resistor 522.

An amount of the power dissipated in the LDO regulator 514 in FIG. 5 can be represented by Equation 3 below:

$$\text{Disspated Power} \approx (V_{INT} - V_{OUT}) * I_{OUT} \qquad \text{Equation 3.}$$

In Equation 3, $I_{OUT}$ denotes an output current flowing into a load (e.g., the load 260 in FIG. 2).

Figure 6:
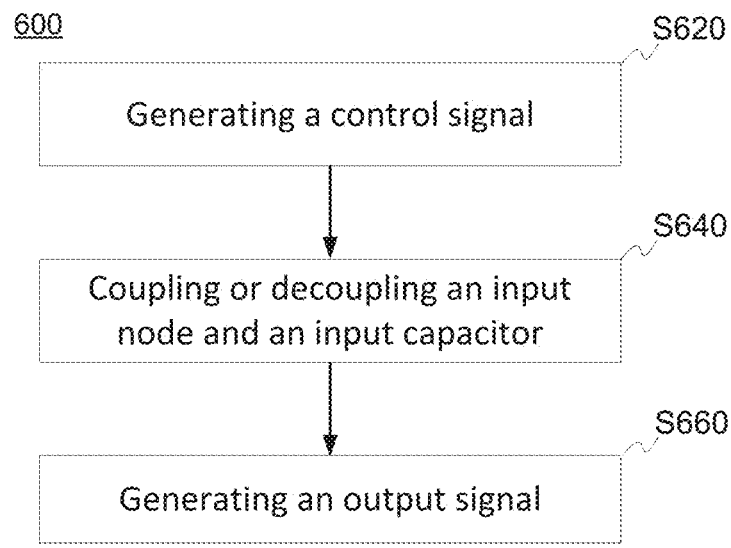
FIG. 6 illustrates a process performed by a controller suitable for use as a controller in the power converter of FIG. 2 according to an embodiment.

FIG. 6 illustrates a process 600 performed by a controller (e.g., the controller 210 in FIG. 2) of a power converter (e.g., the power converter 200 in FIG. 2) according to an embodiment. The controller includes a charging circuit (e.g., the charging circuit 206 in FIG. 2) and a regulator (e.g., the regulator 214 in FIG. 2). The charging circuit includes an input node (e.g., the input node $N_{IN}$ in FIG. 3), a detection circuit (e.g., the detection circuit 308 in FIG. 3), a switching device (e.g., the switching device 324 in FIG. 3), and an input capacitor (e.g., the input capacitor 312 in FIG. 3).

At S620, the detection circuit receives an input signal (e.g., the input voltage $V_{IN}$ in FIG. 3) through the input node and an intermediate signal (e.g., the intermediate voltage $V_{INT}$) from the input capacitor, and generates a control signal (e.g., the gate voltage $V_G$ in FIG. 3) in response to the received input signal and intermediate signal.

At S640, the detection circuit controls the switching device to couple or decouple the input node and the input capacitor in response to the control signal. In an embodiment, the detection circuit turns on the switching device to couple the input node and the capacitor in response to the control signal having a first logic value (e.g., a logic high value), and turns off the switching device to decouple the input node and the capacitor in response to the control signal having a second logic value (e.g., a logic low value).

For example, the detection circuit outputs the control signal having a logic high value when a value of the intermediate signal is equal to or greater than a value of the input signal. The detection circuit outputs the control signal having a logic low value when a value of a scaled version of the input signal (e.g., the scaled input voltage $V_{INS}$ in FIG. 3) is equal to or greater than a value of a reference signal (e.g., the reference voltage $V_{REF\_IN}$ in FIG. 3).

At S660, the regulator generates an output signal (e.g., the output voltage $V_{OUT}$ in FIG. 5) in response to the intermediate signal. In an embodiment, the regulator is a low-dropout (LDO) regulator including an amplifier (e.g., the amplifier 518 in FIG. 5) and a transistor (the transistor 516 in FIG. 5). The amplifier generates an amplified signal indicating a difference between a value of a scaled version of the output signal and a value a reference signal (e.g., the reference voltage $V_{REF\_OUT}$ in FIG. 5), and adjusts a resistance value of the transistor in response to the amplified signal. As a result, the regulator maintains a value of the output signal substantially constant.

Embodiments of the present disclosure include electronic devices, e.g., one or more packaged semiconductor devices, configured to perform one or more of the operations described herein. However, embodiments are not limited thereto.

While this invention has been described in connection with what is presently considered to be practical embodiments, embodiments are not limited to the disclosed embodiments, but, on the contrary, may include various modifications and equivalent arrangements included within the spirit and scope of the appended claims. The order of operations described in a process is illustrative and some operations may be re-ordered. Further, two or more embodiments may be combined.

What is claimed is:

1. A method for controlling a power converter, the method comprising:
   receiving an input signal through an input node and generating an intermediate signal using a capacitor;
   comparing a scaled version of the input signal and a first reference signal, the scaled version of the input signal having a waveform of a rectified alternating current (AC) signal;
   generating a control signal in response to the input signal and the intermediate signal;
   decoupling the input node and the capacitor when a value of the scaled version of the input signal is equal to or greater than a value of the first reference signal; and
   coupling the input node and the capacitor during a first period to charge the capacitor using a current during a second period, the second period being shorter than the first period.

2. The method of claim 1, further comprising:
   turning on a switching device to couple the input node and the capacitor when a value of the intermediate signal is equal to or greater than a value of the input signal; and
   turning off the switching device to decouple the input node and the capacitor when the value of the scaled version of the input signal is equal to or greater than the value of the first reference signal.

3. The method of claim 2, further comprising:
   generating the control signal having a first logic value in response to a first comparison signal indicating that the value of the intermediate signal is equal to or greater than the value of the input signal; and
   generating the control signal having a second logic value in response to a second comparison signal indicating that the value of the scaled version of the input signal is equal to or greater than the value of the first reference signal.

4. The method of claim 1, further comprising comparing a value of the intermediate signal and a value of the input signal using a comparator.

5. The method of claim 1, wherein the current flows through a switching device coupled between the input node and the capacitor.

6. The method of claim 1, wherein the second period is determined based on the input signal and the intermediate signal.

7. The method of claim 1, further comprising:
   generating an output signal in response to the intermediate signal;
   amplifying a difference between a value of a scaled version of the output signal and a value of a second reference signal to generate an amplified signal; and
   adjusting a resistance value in response to the amplified signal to maintain a value of the output signal substantially constant.

8. The method of claim 1, wherein the first period includes a first time interval and a second time interval, the second time interval corresponding to the second period and being subsequent to the first time interval, a value of the intermediate signal remaining higher than a value of the input signal during the first time interval.

9. The method of claim 1, wherein the scaled version of the input signal is generated using a voltage divider.

10. A circuit for controlling a power converter, the circuit comprising:
    an input node to receive an input signal;
    a first capacitor configured to provide an intermediate signal; and
    a detection circuit configured to compare a scaled version of the input signal and a first reference signal, to couple the input node and the first capacitor during a first period to charge the first capacitor using a current during a second period, the second period being shorter than the first period, to decouple the input node and the first capacitor when a value of the scaled version of the input signal is equal to or greater than a value of the first reference signal, and to generate a control signal in response to the input signal and the intermediate signal, the scaled version of the input signal having a waveform of a rectified alternating current (AC) signal.

11. The circuit of claim 10, further comprising a switching device configured to couple the input node and the first capacitor,
    wherein the switching device is turned on in response to the control signal having a first logic value, and the switching device is turned off in response to the control signal having a second logic value.

12. The circuit of claim 10, wherein the detection circuit turns on the switching device to couple the input node and the first capacitor when a value of the intermediate signal is equal to or greater than a value of the input signal.

13. The circuit of claim 12, wherein the detection circuit includes:
    a first comparator generating a first output signal by comparing the value of the intermediate signal and the value of the input signal;
    a second comparator generating a second output signal by comparing the value of the scaled version of the input signal and the value of the first reference signal; and
    a flip-flop generating the control signal in response to the first output signal and the second output signal.

14. The circuit of claim 10, wherein the detection circuit includes a first comparator comparing a value of the intermediate signal and a value of the input signal and,
    wherein the first comparator outputs a first output signal when a value of the intermediate signal is equal to or greater than a value of the input signal.

15. The circuit of claim 14, wherein the detection circuit further includes a second comparator comparing the value of the scaled version of the input signal and the value of the first reference signal, and
    wherein the second comparator outputs a second output signal indicating when the value of the scaled version of the input signal is equal to or greater than the value of the first reference signal.

16. The circuit of claim 15, wherein the input node is a first node, and
    wherein the detection circuit further includes:
    a flip-flop generating the control signal in response to the first output signal and the second output signal;
    a first resistor having a first end connected to the first node and a second end connected to a second node, the second node outputting the scaled version of the input signal; and
    a second resistor having a first end connected to the second node and a second end connected to a ground.

17. The circuit of claim 10, further comprising:
a regulator configured to generate an output signal in response to the intermediate signal; and
a second capacitor having a first end coupled to an output of the regulator and a second end connected to a ground.

18. The power converter of claim 10, wherein the detection circuit includes a switching device configured to couple the input node and the first capacitor, and
wherein the detection circuit turns on the switching device to couple the input node and the capacitor when the input signal has a value substantially equal to a value of the intermediate signal and turns off the switching device to decouple the input node and the capacitor when the value of the scaled version of the input signal is equal to or greater than the value of the first reference signal.

19. A power converter comprising:
an input capacitor generating an intermediate voltage;
a regulator configured to generate an output signal in response to the intermediate signal; and
a charging circuit configured to receive an input voltage through an input node and charge the input capacitor during a charging period in response to the input voltage and the intermediate voltage, the charging circuit including:
a detection circuit configured to compare a scaled version of the input voltage and a reference signal, generate a control voltage in response to the input voltage and the intermediate voltage, to couple the input node and the capacitor during a first period to charge the capacitor using a current during the charging period, the charging period being shorter than the first period, and to decouple the input node and the input capacitor when a value of the scaled version of the input voltage is equal to or greater than a value of the reference signal, the scaled version of the input voltage having a waveform of a rectified alternating current (AC) voltage.

* * * * *